(12) United States Patent
Sloan et al.

(10) Patent No.: US 9,893,797 B2
(45) Date of Patent: Feb. 13, 2018

(54) WIRELESS RELAY

(71) Applicants: VOYOMOTIVE, LLC, Ypsilanti, MI (US); Adam Sloan, Ann Arbor, MI (US); Robert Vogt, Ypsilanti, MI (US)

(72) Inventors: Adam Sloan, Ann Arbor, MI (US); Robert Vogt, Ypsilanti, MI (US)

(73) Assignee: Voyomotive, LLC, San Francisco, CA (US)

( * ) Notice: Subject to any disclaimer, the term of this patent is extended or adjusted under 35 U.S.C. 154(b) by 0 days.

(21) Appl. No.: 15/114,115

(22) PCT Filed: Jan. 29, 2015

(86) PCT No.: PCT/US2015/013525
§ 371 (c)(1),
(2) Date: Jul. 26, 2016

(87) PCT Pub. No.: WO2015/116821
PCT Pub. Date: Aug. 6, 2015

(65) Prior Publication Data
US 2017/0005718 A1 Jan. 5, 2017

Related U.S. Application Data

(60) Provisional application No. 61/934,971, filed on Feb. 3, 2014.

(51) Int. Cl.
*H04B 7/155* (2006.01)
*H04W 4/04* (2009.01)
*H04W 88/12* (2009.01)

(52) U.S. Cl.
CPC ........ *H04B 7/15528* (2013.01); *H04W 4/046* (2013.01); *H04W 88/12* (2013.01)

(58) Field of Classification Search
None
See application file for complete search history.

(56) References Cited

U.S. PATENT DOCUMENTS

| | | |
|---|---|---|
| 6,615,056 B1 | 9/2003 | Taylor et al. |
| 6,756,885 B1 | 6/2004 | Flick |
| 9,108,640 B2 | 8/2015 | Jackson |
| 2003/0002612 A1 | 1/2003 | Menard |
| 2003/0132851 A1 | 7/2003 | Gottlieb |
| 2008/0170699 A1 | 7/2008 | Fratti et al. |
| 2008/0231412 A1* | 9/2008 | Owen ................. G06F 17/5036 338/118 |
| 2009/0015216 A1 | 1/2009 | Seberger et al. |
| 2009/0102296 A1* | 4/2009 | Greene ................. H01Q 1/243 307/149 |
| 2010/0290386 A1 | 11/2010 | Hinojosa et al. |
| 2011/0119773 A1 | 5/2011 | Woytowitz |
| 2012/0108917 A1 | 5/2012 | Libbus et al. |
| 2016/0112517 A1 | 4/2016 | Wilson |

FOREIGN PATENT DOCUMENTS

CN 103543660 1/2014

* cited by examiner

*Primary Examiner* — Brian Roberts
(74) *Attorney, Agent, or Firm* — The Petruzzi Law Firm; James D. Petruzzi

(57) ABSTRACT

This invention provides a wireless relay which derives power for operation from voltages connected to inputs to the relay. The wireless relay has a radio receiver, a microcontroller, control terminals, and switched terminals. Optionally, the wireless relay may further comprise a transmitter.

20 Claims, 12 Drawing Sheets

WIRELESS RELAY

CROSS REFERENCE TO RELATED APPLICATIONS

This is a 371 of PCT Application No. US2015/13525 filed Jan. 29, 2015 which claims the benefit of U.S. Provisional Patent Application Ser. No. 61/934,971, filed on Feb. 3, 2014, entitled "Method and Apparatus For Monitoring and Reporting Equipment Operating Conditions and Diagnostic Information" which is incorporated herein by reference.

BACKGROUND OF THE INVENTION

Field of the Invention

This invention relates to a wireless radio controlled relay. The wireless relay obtains power from the voltage sources connected to the relay. The wireless relay can receive commands from a relay controller. Optionally, the wireless relay is capable of bi-directional communication and can both send signals to and receive commands from, a relay controller.

Description of Related Art

Radio controlled relays are known. These relays are able to receive a signal from a controller and perform an action in response to the signal. Relays which can both perform an action in response to a signal and send a signal to a relay controller are also known.

U.S. Pat. No. 6,028,525 relates to a tilt switch, which when activated, sends signals to a wireless remote receiver. The receiver will alert the human operator and/or execute a process or any programmed action.

U.S. Pat. No. 6,700,310 relates to a wireless switch is provided having a twenty-year life energy harvesting arrangement for self-powering a wireless transmitter. The energy harvesting arrangement is implemented in one embodiment using a piezoelectric switch element. A tritium light source and photovoltaic device are used in a second embodiment, while a black light source and photovoltaic device are used in a third embodiment. The energy harvesting wireless switch arrangement of the present invention can be combined, for example, with a vehicle side mirror switch, to reduce the complexity of the wire harness feeding the door. The wireless switch can be located without regard to accessibility of a wiring harness or connector.

U.S. Pat. No. 6,832,072 relates to a wireless switch comprising: a sensor for sensing a change of a state of a barrier; a selector positionable between a first position and a second position; a transmitter operatively coupled to the sensor and selector; and wherein the transmitter transmits a first wireless signal when the selector is positioned in the first position and the sensor senses a change of state, and the transmitter transmits a second wireless signal different from the first signal when the selector is positioned in the second position and the sensor senses the change of state.

U.S. Pat. No. 7,421,247 relates to a wireless switch comprising: a sensor for sensing a change of a state of a barrier; a selector positionable between a first position and a second position; a transmitter operatively coupled to the sensor and selector; and wherein the transmitter transmits a first wireless signal when the selector is positioned in the first position and the sensor senses a change of state, and the transmitter transmits a second wireless signal different from the first signal when the selector is positioned in the second position and the sensor senses the change of state.

U.S. Pat. No. 7,519,326 relates to a wireless switch component and an associated control module component that facilitate wireless control over a load device. The load device is operatively coupled to the control module component and is selectively activated thereby in accordance with a wireless control signal sent by the wireless switch component.

U.S. Pat. No. 8,360,505 relates to a motor vehicle in which a door is open and held by engaging latch A door is open and held by engaging a latch with a striker of a vehicle body. The door has a release actuator connected to the latch. The vehicle body includes a power drive and a control module. An operating unit instructs the control module to close the door. The control module instructs the release actuator to disengage the latch from the striker. After the control module instructs the power drive to start closing of the door, releasing of the release actuator is stopped by the control module at a door position determined by actual voltage of a power source.

US Patent Publication 2009/0079582 relates to a wireless switch module fitted with a frame and a covering board, so as to form a wireless switch assembly, which is capable of being installed on a wall or assembled into a movable adapted-box. The wireless switch module comprises at least one switch cell and at least one control unit. The switch cell comprises a switch circuit, a switch button and a relay, and the control unit comprises a micro control circuit coupling with the relay. Within the wireless switch module, the switch button is applied to switch-control the switch circuit "On" and "Off"; furthermore, the micro control circuit is also applied to switch-control the switch circuit "On" and "Off" via the relay after receiving and analyzing a wireless digital control signal.

US Patent Publication 2010/0027516 relates to a wireless switch device that includes a first wired Ethernet interface and a second wired Ethernet interface, and a plurality of virtual wireless switch modules (VWSMs) implemented within the wireless switch device. The VWSMs include a first VWSM that is coupled to a first access port via the first wired Ethernet interface that is allocated to the first VWSM, and a second VWSM that is coupled to a second access port via the second wired Ethernet interface that is allocated to the second VWSM. The first VWSM can be control and manage the first access port, and the second VWSM can control and manage the second access port.

In a conventional normally open relay, the control terminals are connected to the relay coil. When there is sufficient voltage on the control terminals, the relay closes and the switched terminals are connected.

SUMMARY OF THE INVENTION

The present invention provides a wireless relay. The wireless relay has a radio receiver 9, a microcontroller 7, control terminals 3 and 4, and switched terminals 5 and 6. The control terminal 3 and control terminal 4 are connected to a microcontroller 7 which is connected to the relay coil 14 and controls how the relay responds to signals sent to the control terminals 3 and 4. The microcontroller 7 receives instructions from a relay controller. If a signal to close the relay is applied to control terminals 3 and 4 the microcontroller 7 determines whether or not the signal is passed through to the relay. For example, if the wireless relay is part of an engine starting system, engine start signals are sent to the relay microcontroller 7 rather than to the relay coils 14. The engine start signal is simply a voltage which would be sufficient to cause the starter relay to close and start the engine. Based on instructions from the relay controller, the microcontroller 7 determines whether or not to send the start signal to the relay coil 14 and allow the relay to close, and thus start the engine. If the relay microcontroller 7 has received an instruction from a relay controller to ignore engine start signals, the engine start signal would not be sent to the relay coil 14. There is a resistor 43 which simulates coil resistance.

Advantages of the present invention will be readily appreciated as the same becomes better understood by reference to the following detailed description when considered in connection with the accompanying drawings.

DETAILED DESCRIPTION OF THE EMBODIMENTS

Figure 1:
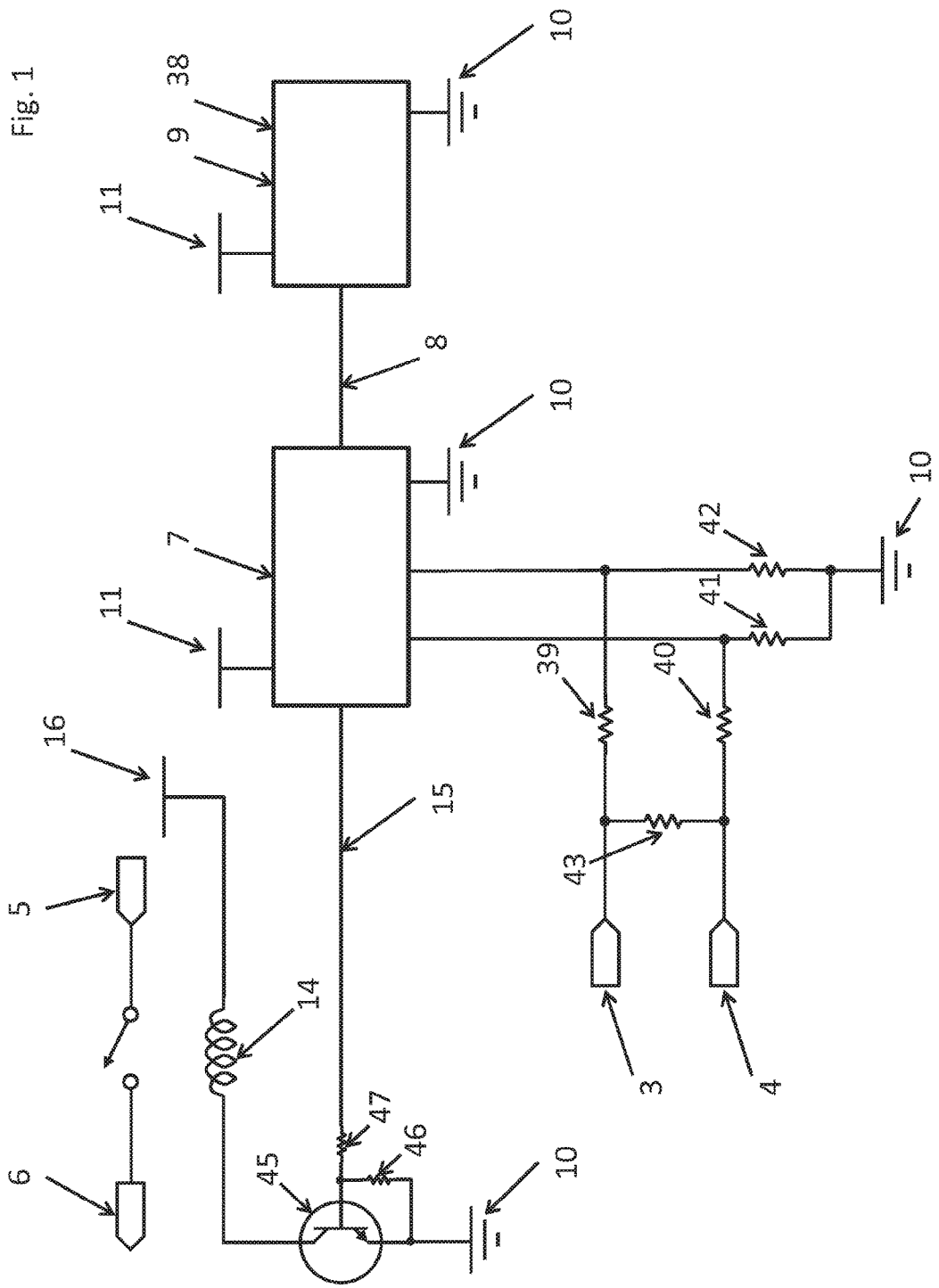
FIG. 1 illustrates a block diagram of normally open wireless relay.

FIG. 1 illustrates a block diagram of a normally open wireless relay. When actuated, the wireless relay connects terminal 5 of the relay to terminal 6 of the relay. Terminal 3 and terminal 4 are the control terminals of the relay. The wireless relay is controlled by a microcontroller 7 which receives commands from a radio receiver 9.

Optionally the receiver 9 may include a transmitter 38. The microcontroller 7 is connected to the radio receiver by a conductor 8. Both the microcontroller 7 and the radio receiver 9 are grounded 10 and receive power from a low voltage bus 11. The wireless relay has a relay coil 14. One end of the relay coil is connected to positive voltage bus 16. The other end of the relay coil is connected to an NPN transistor. When the microcontroller 7 supplies a voltage to the base of NPN transistor 45, through conductor 15, the voltage from the conductor 15, causes transistor 45 to become conductive. When the transistor 45 is in a conductive state, the end of the relay coil is brought down to ground and current flows in the relay coil. This causes the relay to close. The transistor 45 is biased by bias resistors 46 and 47. The microcontroller 7 is connected to the base of transistor 45 by conductor 15. The signal from the control terminals 3 and 4 goes through a resistor voltage divider comprising resistors 39, 40, 41, and 42. The output of the voltage divider is used to signal the microcontroller 7. Resistor 43 simulates coil resistance. Resistor 43 may have a variety of values depending on coil being simulated. Generally, relay coils have a resistance between 50 and 1000 ohms and thus resistor 43 generally has a resistance between 50 and 1000 ohms.

Figure 2:
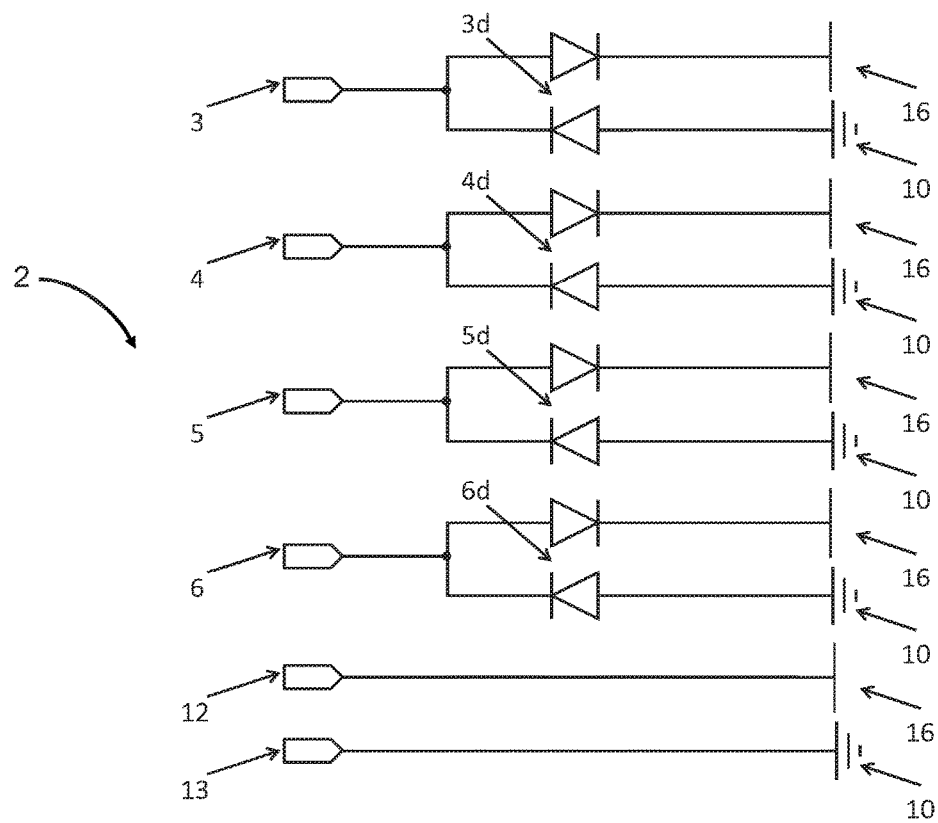
FIG. 2 illustrates a power scavenging circuit which optionally powers the wireless relay.

FIG. 2 illustrates a power scavenging circuit 2 which optionally powers the wireless relay. The wireless relay inputs are 3, 4, 5, 6, positive voltage input 12, and negative voltage input 13. There are diode pairs 3*d*, 4*d*, 5*d*, and 6*d*. The positive output of the circuit is supplied to positive voltage bus 16 and 10 is ground.

Figure 3:
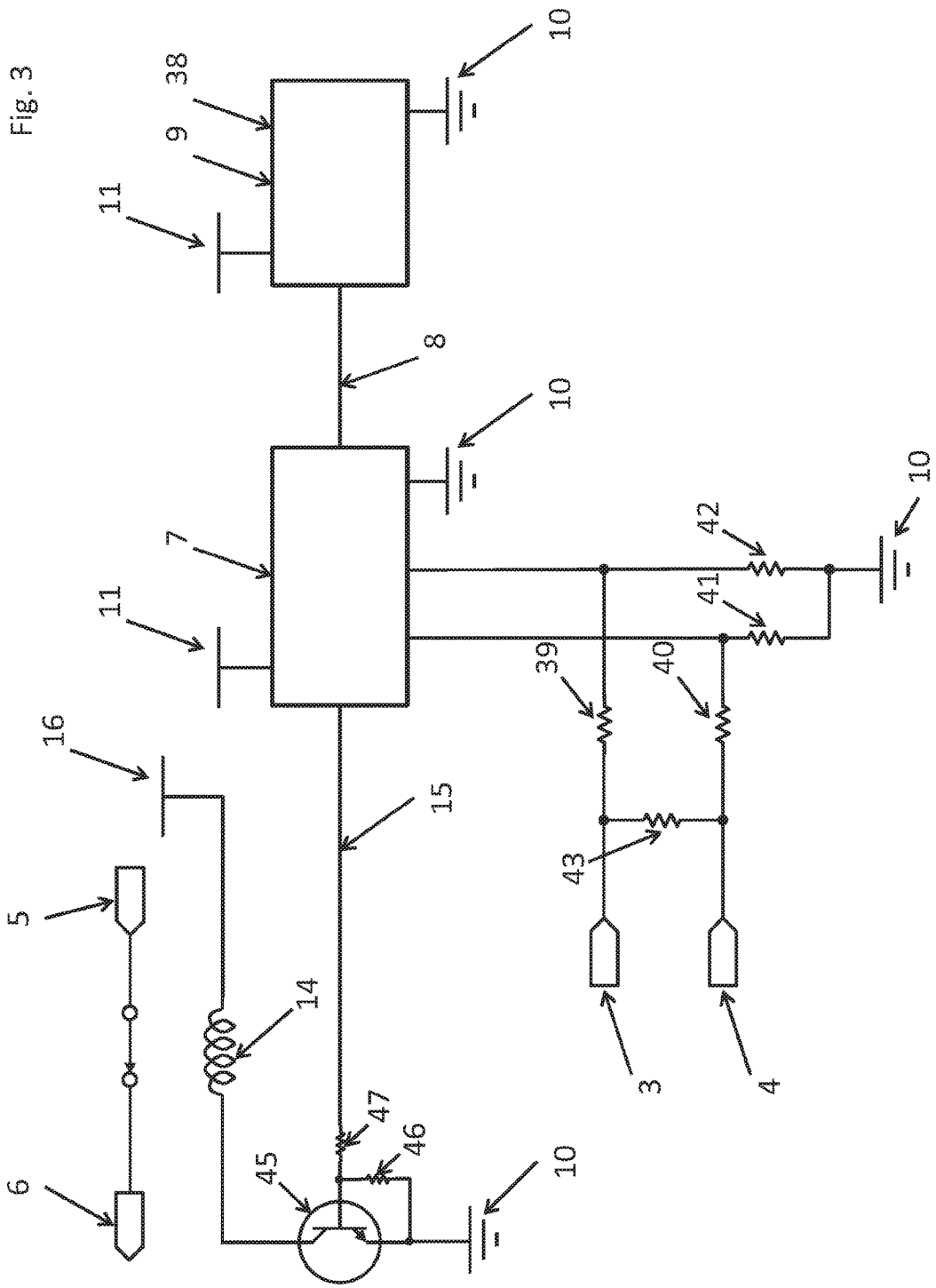
FIG. 3 illustrates a block diagram of a normally closed wireless relay.

FIG. 3 illustrates a block diagram of a normally closed wireless relay. When actuated, the wireless relay disconnects terminal 5 of the relay from terminal 6 of the relay. Terminal 3 and terminal 4 are the control terminals of the wireless relay. The wireless relay is controlled by a microcontroller 7 which receives commands from a radio receiver 9. Optionally the receiver 9 may include a transmitter 38. One end of the relay coil 14 is connected to positive voltage bus 16. The other end of the relay coil is connected to the collector of an NPN transistor. When the microcontroller 7 supplies a voltage to the base of NPN transistor 45, through conductor 15, transistor 45 becomes conductive. When the transistor 45 is in a conductive state, the end of the relay coil 14 is brought down to ground and current flows in the relay coil 14. This causes the relay to open. The microcontroller 7 is connected to the radio receiver 9 by a conductor 8. Both the microcontroller 7 and the radio receiver 9 are grounded 10 and receive power from low voltage bus 11. The signal from the control terminals 3 and 4 goes through a resistor voltage divider comprising resistors 39, 40, 41, and 42. Resistor 43 simulates coil resistance.

Figure 4:
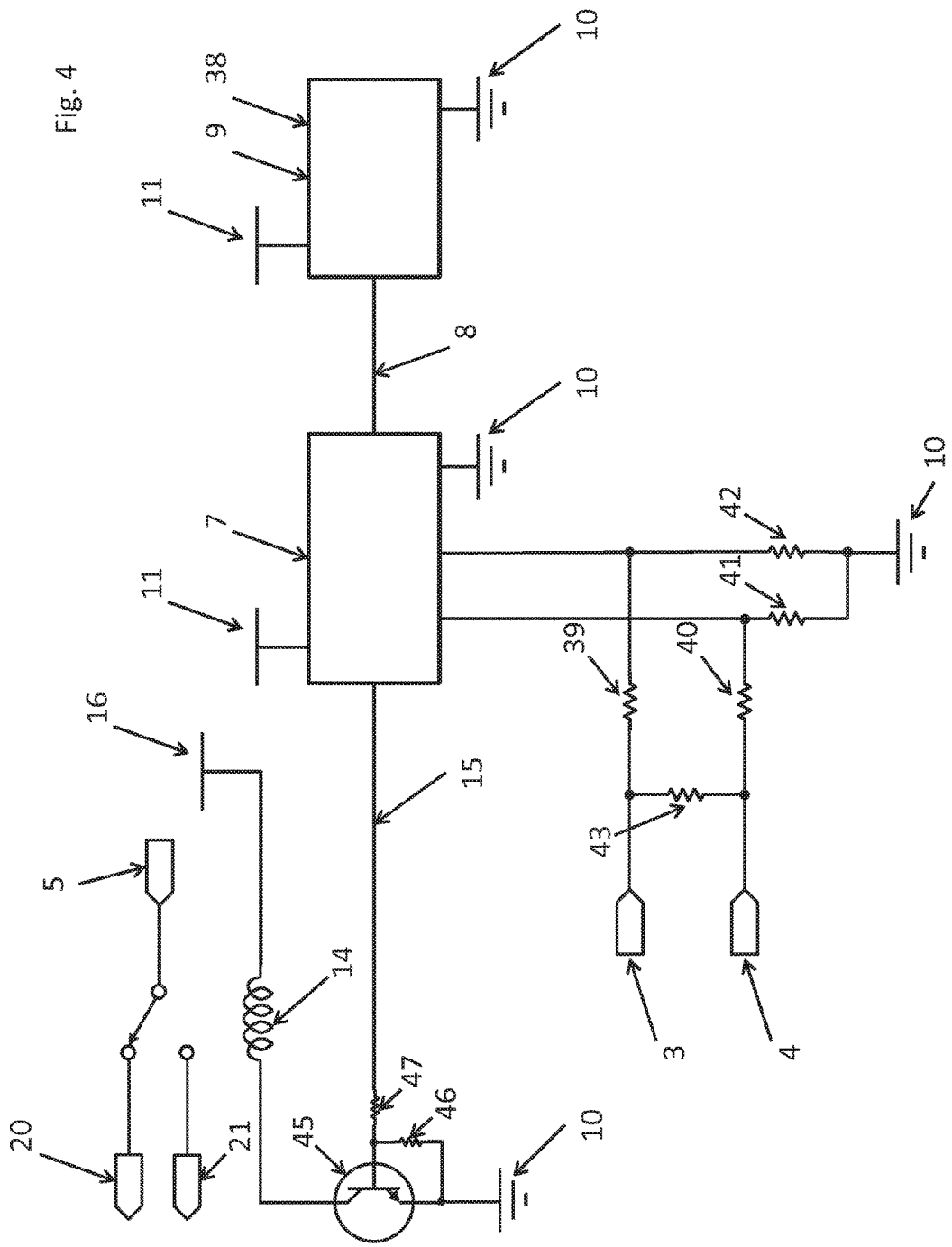
FIG. 4 illustrates a block diagram of a single pole double throw wireless relay.

FIG. 4 illustrates a block diagram of a single pole double throw wireless relay. When actuated, the wireless relay disconnects terminal 5 of the relay from terminal 20 of the relay and connects it to terminal 21 of the relay. Terminal 3 and terminal 4 are the control terminals of the wireless relay. The wireless relay is controlled by a microcontroller 7 which receives commands from a radio receiver 9. Optionally the receiver 9 may include a transmitter 38. The microcontroller 7 is connected to the radio receiver by a conductor 8. Both the microcontroller 7 and the radio receiver 9 are grounded 10 and receive power from low voltage bus 11. One end of the relay coil 14 is connected to positive voltage bus 16. The other end of the relay coil 14 is connected to an NPN transistor. When the controller 7 supplies a voltage to the base of NPN transistor 45, through conductor 15, transistor 45 becomes conductive. When the transistor 45 is in a conductive state, the end of the relay coil is brought down to ground and current flows in the relay coil. This causes the relay to connect terminal 5 to terminal 21. Terminal 5 is normally connected to terminal 20 and is connected to terminal 21 when the relay is actuated. The signal from the control terminals 3 and 4 goes through a resistor voltage divider comprising resistors 39, 40, 41, and 42. Resistor 43 simulates coil resistance.

Figure 5:
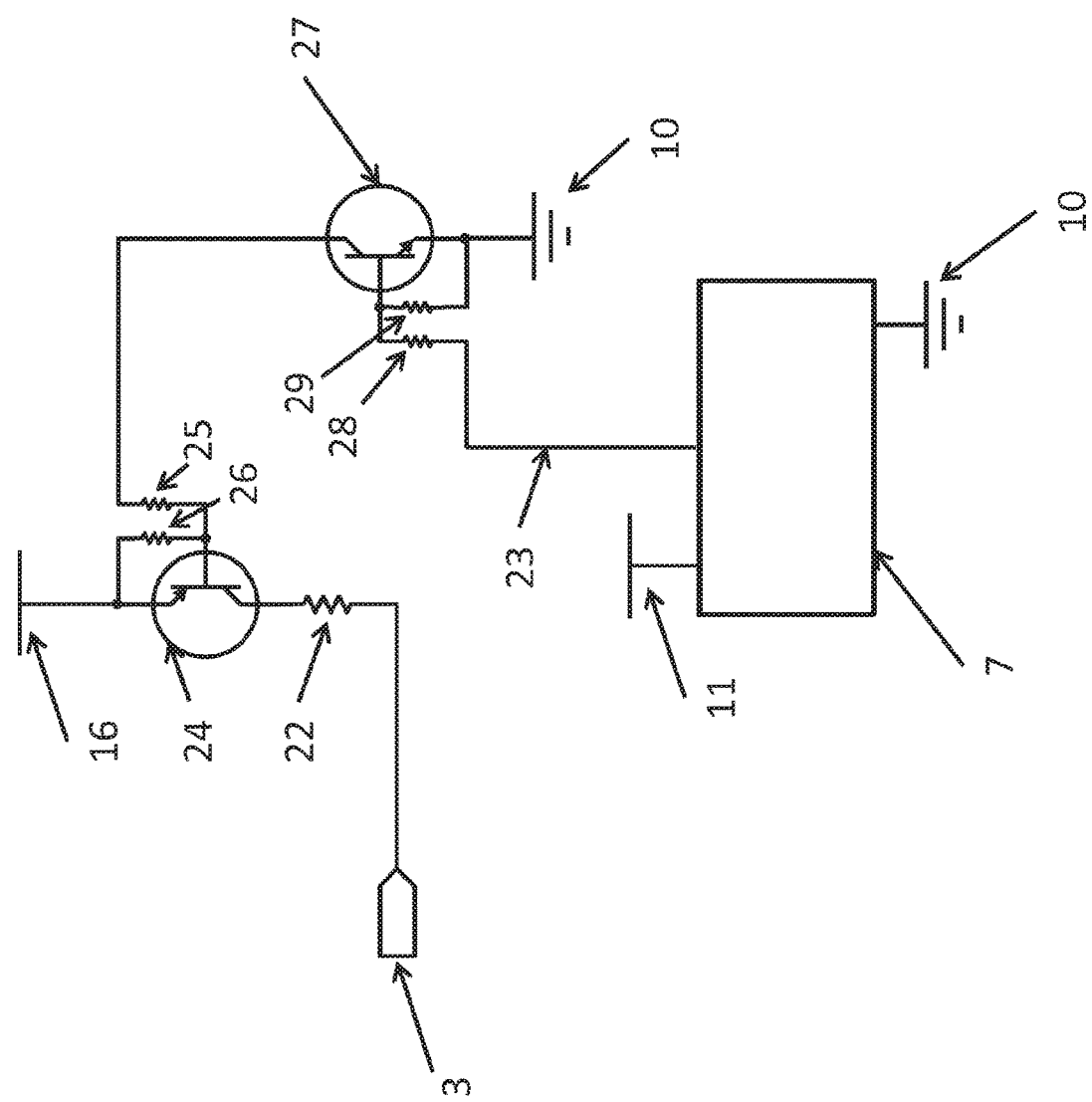
FIG. 5 illustrates a pull up resistor circuit.

FIG. 5 illustrates a pull up resistor circuit. This circuit connects control terminal 3 or 4 to a pull up resistor 22. This circuit enables the wireless relay device to connect control terminal 3 to positive supply voltage through the pull up resistor 22 when appropriate. The same circuit could be used to connect control terminal 4 to a positive supply voltage. The typical value of the pull up resistor 22 is 1000 ohms. When the controller 7 supplies a voltage to the base of NPN transistor 27, through conductor 23, the voltage from the conductor 23, transistor 27 becomes conductive. Transistor 27 operates with bias resistors 28 and 29. Current flows through resistors 25 and 26 creating a bias voltage on PNP transistor 24. The low voltage bus 11 supplies power to the microcontroller 7. Voltage source 16 supplies the voltage which transistor 24 switches.

Figure 6:
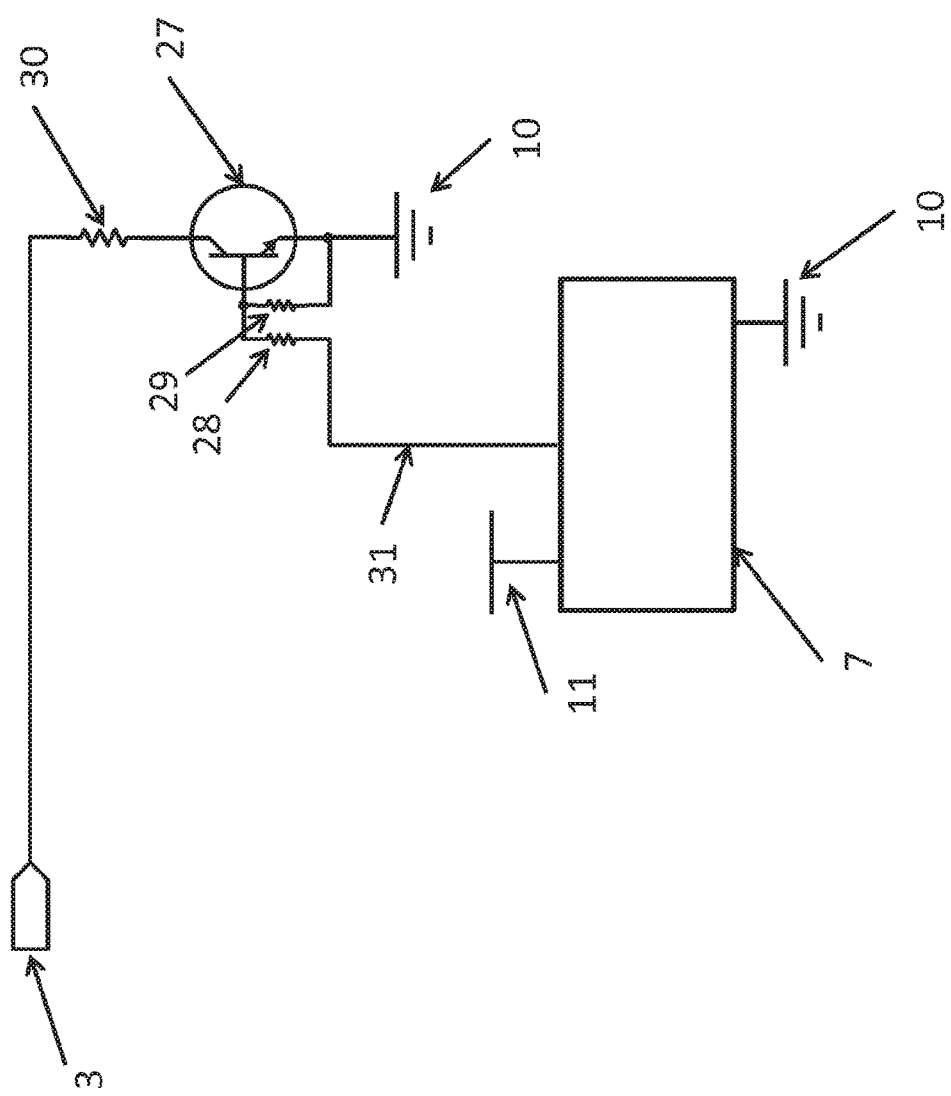
FIG. 6 illustrates a pull down resistor circuit.

FIG. 6 illustrates a pull down resistor circuit. This circuit connects a control terminal 3 to a pull down resistor 30. This similar circuit can pull down terminal 4. This circuit enables the microcontroller to connect control terminal 3 or control terminal 4 to ground 10 through pull down resistor 30 when appropriate. The typical value of pull down resistor 30 is 1000 ohms. When a signal from controller 7 is supplied to the base of NPN transistor 27, through conductor 31, transistor 27 becomes conductive. Transistor 27 operates with bias resistors 28 and 29. Low voltage bus 11 supplies power to the microcontroller 7.

Figure 7:
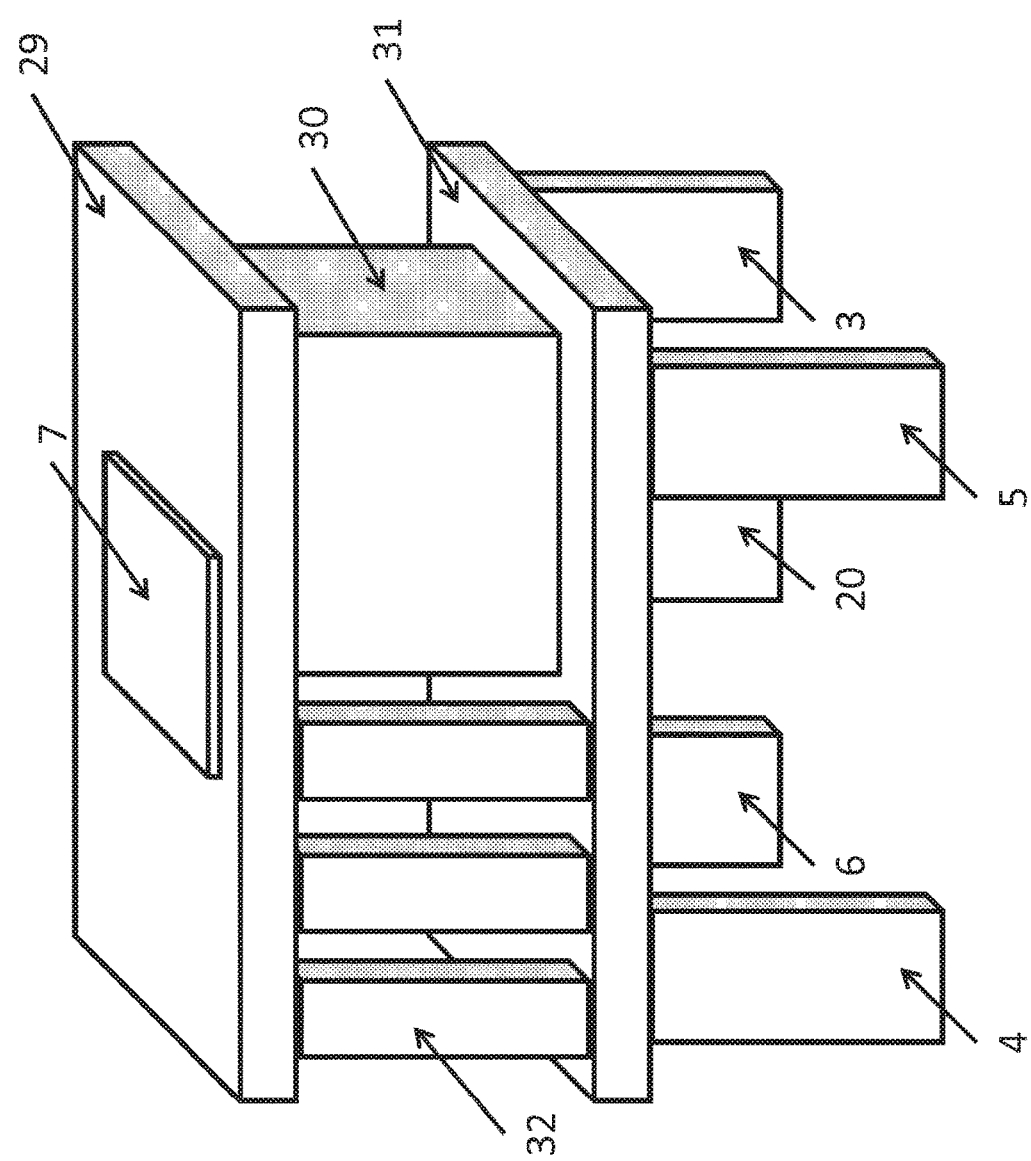
FIG. 7 illustrates the architecture of a wireless relay.

FIG. 7 illustrates the structure of a wireless relay. There is a core board 33, a relay 30, connection terminals 32, and a connector board 31. There are control terminals 3 and 4, switched terminals 5 and 6, microcontroller 7, and output 20.

Figure 8:
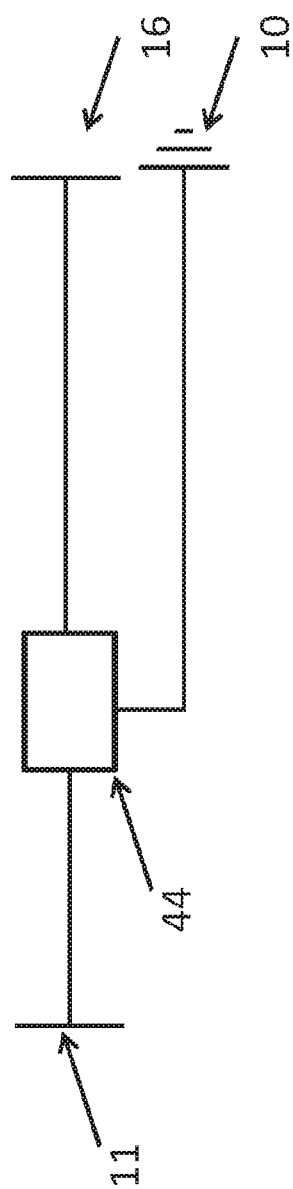
FIG. 8 illustrates a linear voltage regulator.

FIG. 8 illustrates a linear voltage regulator 44 connected to voltage bus 16 to produce a constant 3-4 volt power bus 11.

Figure 9:
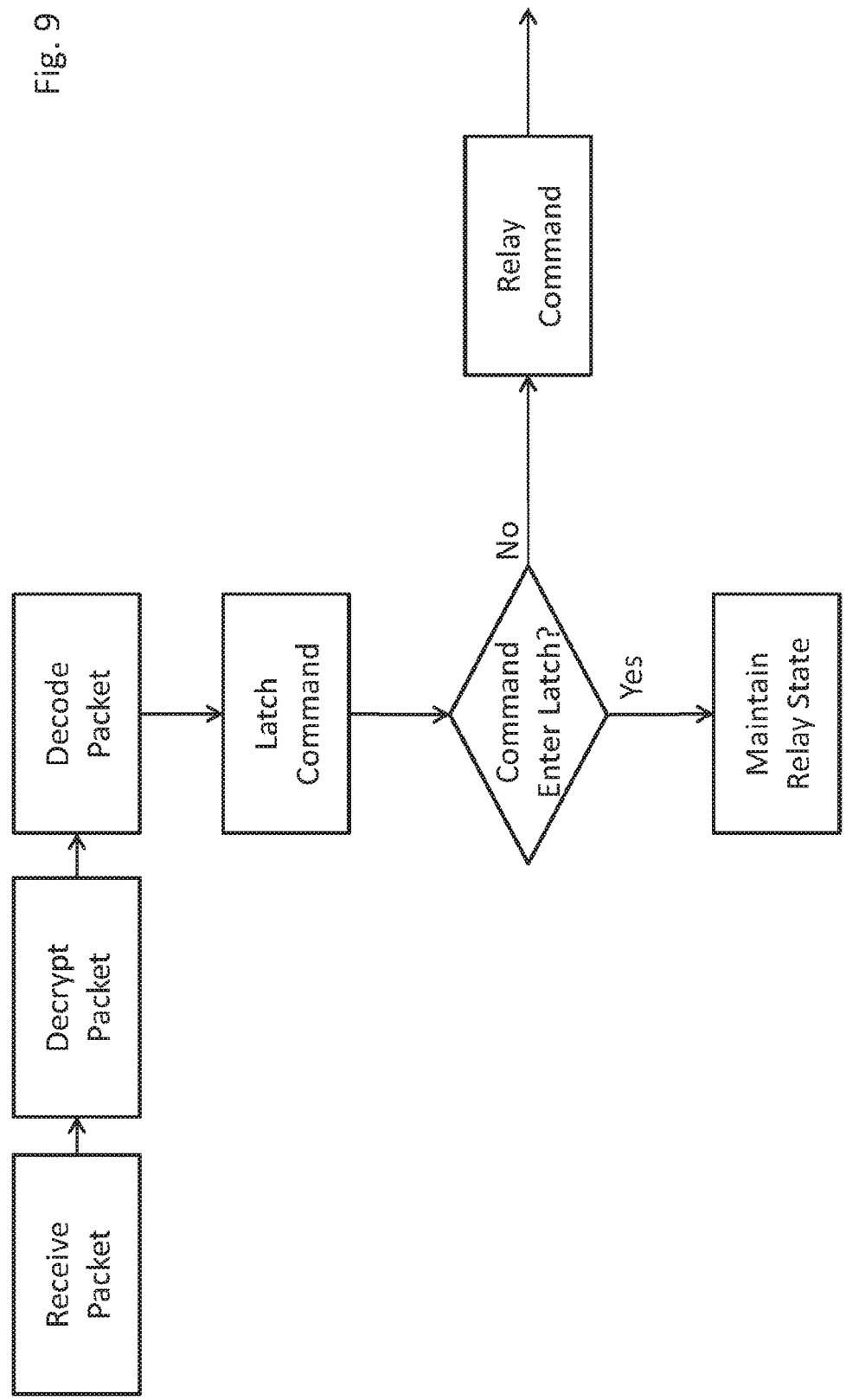
FIG. 9 illustrates the block diagram of the operation of a latching wireless relay device.

FIG. 9 illustrates the block diagram of the operation of a latching wireless relay device. The wireless relay device receives an encrypted packet of information from a relay controller. The microcontroller decrypts the packet and then decodes the packet to obtain a relay command. The microcontroller issues the command to the relay.

Figure 10:
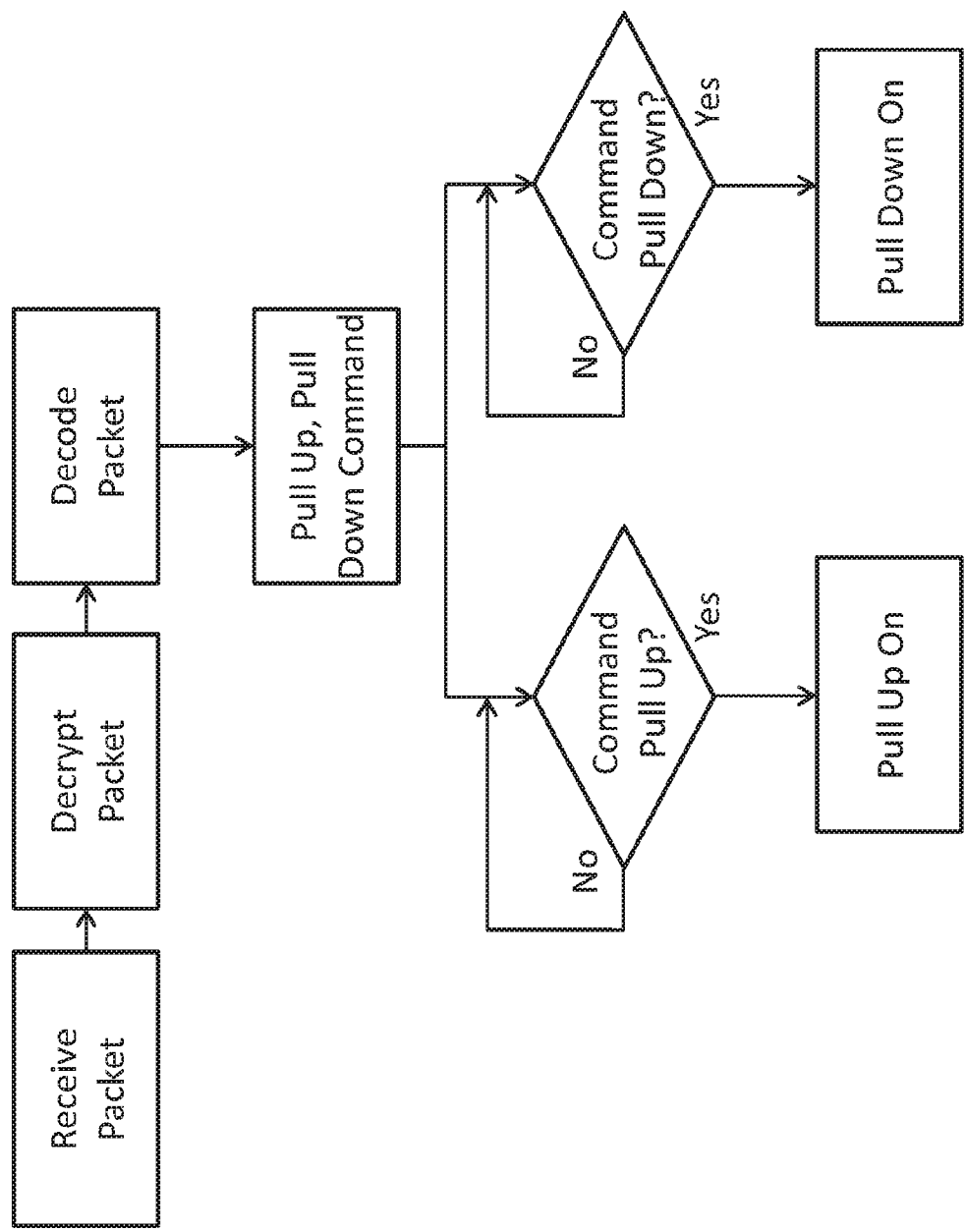
FIG. 10 illustrates the block diagram of the operation of a wireless relay device which controls pull up (PU) and pull down (PD) signals.

FIG. 10 illustrates the block diagram of the operation of a wireless relay device which controls pull up (PU) and pull down (PD) signals. The wireless relay device receives an encrypted packet of information from a relay controller. The microcontroller decrypts the packet and then decodes the packet to obtain a pull up or pull down command. The microcontroller creates a pull up or a pull down signal and applies it to the input terminals of the relay.

Figure 11:
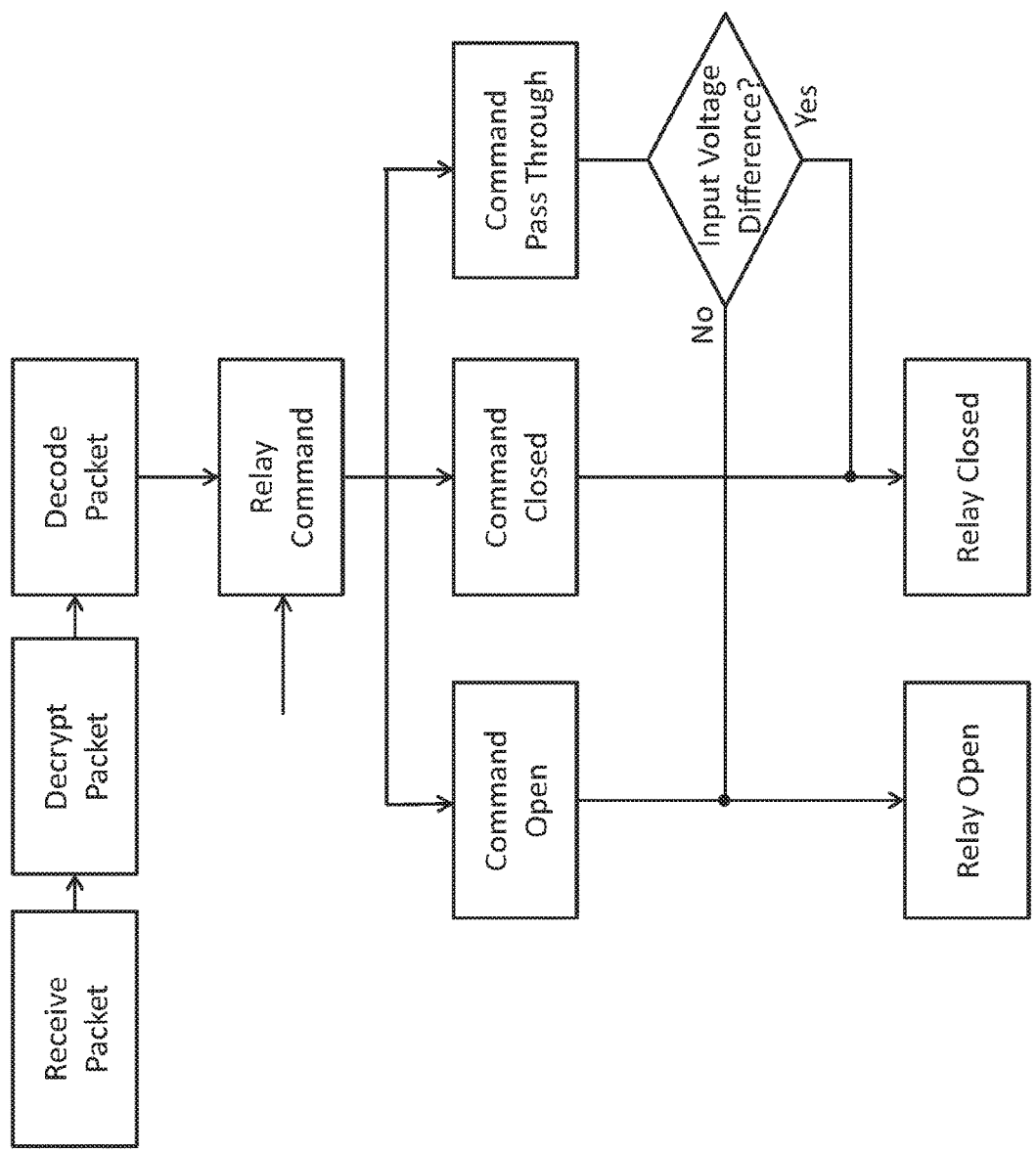
FIG. 11 illustrates the block diagram of a wireless relay device which may receive a command to be open, a command to be closed or a command to pass through commands sent to the relay control terminals.

FIG. 11 illustrates the block diagram of a wireless relay device which may receive a command to be open, a command to be closed, or a command to pass through commands sent to the relay control terminals. The wireless relay receives an encrypted and encoded command. The microcontroller decrypts the command and then decodes it. If the command is to open the relay the relay is held open. If the command is to close the relay the relay closes. If the command is a pass through command, the command on the relay control terminals is passed through to the relay output.

Figure 12:
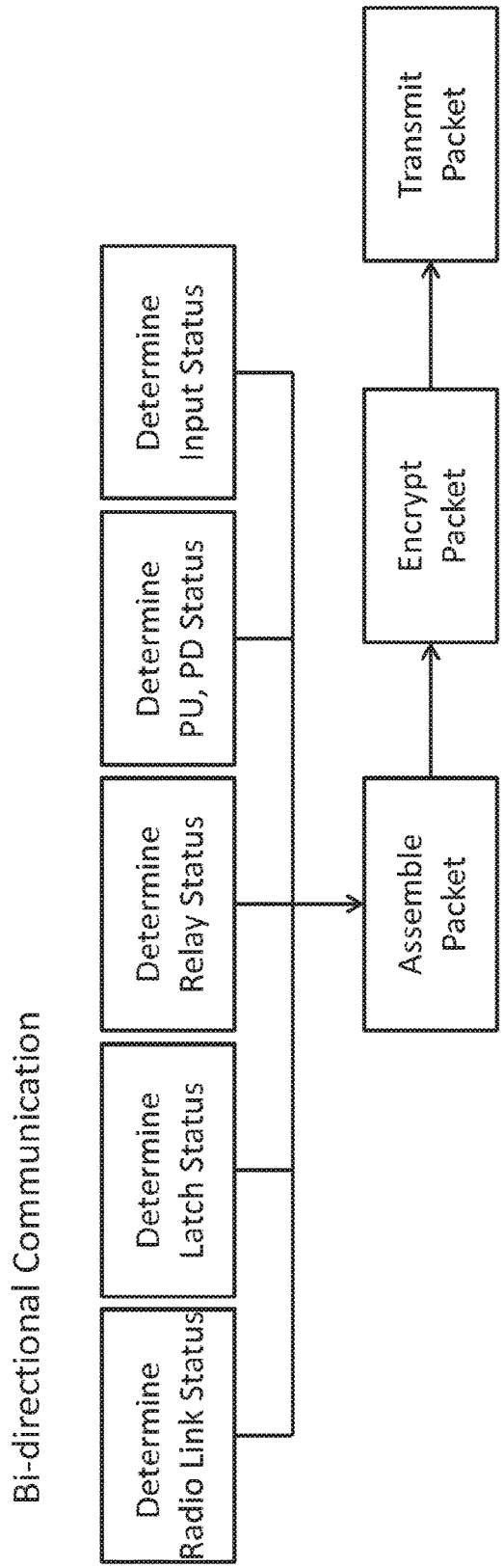
FIG. 12 illustrates the block diagram of the operation of a wireless relay device capable of bidirectional communication.

FIG. 12 illustrates the block diagram of the operation of a wireless relay device capable of bidirectional communication. The wireless relay device determines the status of the radio link to the relay controller, the latch status of the relay, that is whether the relay is latched open or latched closed, the PU/PD status, that is, whether the pull up or pull down signal is connected to the input terminals, and the input status of the relay, that is, the magnitude and polarity of the voltage on inputs 3 and 4 of the relay. The microcontroller also determines the relay status, that is, whether the relay is open or closed. The microcontroller assembles this information into a packet, encrypts the packet and transmits the encrypted packet to the relay controller. The wireless relay may be powered by an external power source. The wireless relay has a positive voltage input 12 and a negative voltage input 13 which allow the wireless relay to be externally powered. The positive voltage input 12 is connected to a positive voltage bus 16 and the negative voltage input 13 is connected to ground 10. In automotive applications, the positive voltage source could be the automobile battery. An automobile battery provides twelve volts. The microcontroller 7 operates at relatively low voltage for example 3-3.5 volts. This voltage is supplied by a low voltage bus 11. The low voltage bus 11 is supplied by a linear voltage regulator 44, such as a Texas Instruments LP 2950 which reduces the voltage on the positive voltage bus 16 to a constant 3.3 volts. The Texas Instruments LP 2950 can be used in an adjustable mode to provide an adjustable voltage. For this application, an output of 3.0 to 3.5 volts would be useful.

Alternatively, the wireless relay may be powered by switching voltage regulator. The switching voltage regulator also supplies the low voltage bus 11 by reducing the voltage on the positive voltage bus 16 to a constant 3.0-3.5 volts. A switching voltage regulator is more power efficient than a linear voltage regulator. Since the switching voltage regulator is more power efficient, it does not generate as much heat under load. Heat generated by the voltage regulator is dissipated on the circuit board if no other thermal management devices are present. A switching voltage regulator allows for a smaller circuit board size than a linear voltage regulator. The smaller amount of heat generated by the switching voltage regulator can be dissipated over a smaller area on the circuit board without overheating other components on the circuit board. Alternatively, the wireless relay may obtain power from a power scavenging circuit which derives power from any voltage source connected to any terminal of the relay. The power scavenging circuit of FIG. 2 comprises an array of diodes arranged so that a positive voltage and current on any terminal will provide power for the positive voltage bus 16. In a floating ground application, a negative voltage on any terminal will provide voltage differential between the positive voltage bus 16 and the floating ground 10. Since in a floating ground application, the wireless relay is able to obtain power from any terminal on the relay which happens to have either a negative or positive voltage input, positive voltage input to 12 and negative voltage input to 13 are optional. In the power scavenging circuit, all relay terminals are connected to positive voltage bus 16 and ground 10 by two diodes of opposite polarity. In other words, every relay input at any terminal is connected to the anode of one diode, and cathode of that diode is connected to positive voltage bus 16. The relay input is also connected to the cathode of another diode, and the anode of that diode is connected to ground 10. By this means, in an application with a floating ground, if a relay input has any voltage, it will serve to either make ground 10 more negative or positive voltage bus 16 more positive. Any voltage on any relay terminal will increase the potential difference between positive voltage bus 16 and ground. For example, suppose that switched terminal 5 becomes negative. The negative voltage will be conducted by the diode for which input 5 is connected to the cathode. This will make ground 10 more negative. Suppose that input 5 becomes positive. Electrons will be conducted through the diode for which input 5 is connected to the anode. This conduction will make the make positive voltage bus 16 more positive. In applications with a true earth ground, negative voltages on the relay terminals will not serve to scavenge power, because a negative voltage cannot make an earth ground more negative. However, a positive voltage on any terminal including the switched terminals, can provide power to the positive voltage bus. The power scavenging circuit allows the same wireless relay to be used in relay circuits with many different pin combinations of inputs, outputs, positive supply voltage, and negative supply voltage. The microcontroller 7 operates at relatively low voltage for example 3-3.5 volts. In many applications, the voltages on the switched terminals of the relay are much higher than the voltages used by the microcontroller. In this situation the power scavenging circuit produces a bus voltage higher than microcontroller can use. The voltage at the positive supply voltage bus 16 may be reduced to a constant 3.3 volts using a linear voltage regulator 44, such as a Texas Instruments LP 2950 linear voltage regulator to provide the desired voltage for low voltage bus 11. The Texas Instruments LP 2950 can be used in an adjustable mode to provide an adjustable voltage. For this application, an output of 3.0 to 3.5 volts would be useful.

The wireless relay of the present invention has a radio receiver 9, a microcontroller 7, control terminals 3 and 4, and switched terminals 5 and 6 and optionally a transmitter 38. A wide variety of commercially available microcontrollers, for example, the Microchip PIC16 family of microcontrollers may be used in the wireless relay. A variety of low powered receivers or transceivers may be used in the wireless relay. For example, the Texas Instruments CC1101 transceiver may be used as a receiver, a transmitter, or a transceiver. The control terminal 3 and control terminal 4 do not directly control the wireless relay. Instead they are connected to a microcontroller 7 which receives commands from a radio receiver 9. The signal on the control terminals is not directly connected to the microcontroller but is passed through a resistor voltage divider before it is sent to the microcontroller 7. This voltage divider reduces the voltage of the relay control signal. For example, the relay control signal could be a twelve volt signal, such as that produced in an automobile when the key is turned to start the engine. A twelve volt signal is too large for the microcontroller 7 and the resistor voltage divider reduces the voltage of the signal to a more manageable level. Resistors 39, 40, 41, and 42 comprise the voltage divider. The values of resistors 39, 40, 41, and 42 depend upon the voltage which is applied to the control terminal. The values should be selected to provide a signal of approximately 3-4 volts to the microcontroller 7 at the maximum signal voltage which the application is likely to produce. A voltage range of 3-3.5 volts is preferred. The microcontroller requires an approximately 3 volt signal and the voltage divider should not draw much current. Accordingly, since the voltage divider is providing a voltage signal and not current to the microcontroller, the values of the resistors can be rather large. Resistors of around 100 kilo-ohms are useful in the voltage divider. If a twelve volt signal is applied between terminal 3 and terminal 4, a ratio of resistor 39 to resistor 42 or resistor 40 to resistor 41 of 3:1 produces a 3 volt signal. A ratio of resistor 39 to resistor 42 or resistor 40 to resistor 41 of 2:1 produces a 4 volt signal. For example, if a twelve volt signal is applied to terminal 3, terminal 4 is at zero volts, resistor 39 is 140 kilo-ohms, and resistor 42 is 60 kilo-ohms, the 12 volt signal would be divided to a 3.6 volt signal. If a twelve volt signal is applied to terminal 3, terminal 4 is at zero volts, resistor 39 is 140 kilo-ohms, and resistor 42 is 57.65 kilo-ohms, the 12 volt signal would be divided to a 3.5 volt signal. If less current flow through the voltage divider is desired, higher resistor values such as resistor 39 being 280 kilo-ohms and resistor 42 being 115.3 kilo-ohms to produce a 3.5 volt signal from an applied signal of 12 volts. Ohms law may be used to calculate other values for the resistors.

The microcontroller 7 is connected to the relay coil and controls how the relay responds to signals sent to the control terminals. The microcontroller receives instruction from a relay controller which determines the appropriate response to relay control signals. Depending upon the commands sent by the relay controller, the microcontroller 7 will follow the instruction it has received from a relay controller 9 to determine whether or not it will pass the signal from control terminal 3 and control terminal 4 to the relay coil 14. Accordingly, if there is a voltage between control terminal 3 and control terminal 4, which would be sufficient to actuate the relay, the microcontroller 7 will follow the instruction it has received from a relay controller 9 to determine whether or not it will pass the signal to the relay coil 14. If there is no voltage between control terminal 3 and control terminal 4, which would be sufficient to actuate the relay, the microcontroller 7 will follow the instruction it has received from a relay controller through receiver 9 to determine whether or not it will create a signal to apply to the relay coil 14. For example, if the wireless relay is part of an engine starting system, engine start signals are sent to the relay microcontroller 7 rather than to the relay coil 14. The engine start signal is simply a voltage which would be sufficient to cause the starter relay to close, and start the engine. If the microcontroller 7 has received an instruction to pass through engine start signals it will send the start signal to the relay coil 14 and allow the relay to close, and thus start the engine. If the relay microcontroller 7 has received an instruction from a relay controller to ignore engine start signals, the engine start signal would not be passed to the relay coil 14.

In the wireless relay illustrated in FIG. 1 a conductor 15 connects the microcontroller to the base of transistor 45. One end of the relay coil 14 is connected to collector of transistor 45. When the microcontroller sends a signal to transistor 45 the transistor becomes conductive and current flows through relay coil 14 to ground 10. This actuates the relay thereby connecting terminal 5 to terminal 6. The wireless relay illustrated in FIG. 3 operates similarly except that the relay is normally closed. A signal sent from the microcontroller to the base of transistor 45 opens the connection between terminal 5 and terminal 6. The wireless relay illustrated in FIG. 4 operates similarly except that a signal from the microcontroller to the base of transistor 45 disconnects terminal 5 from terminal 20 and connects terminal 5 to terminal 21.

The wireless relay of the present invention will function with either a real earth ground 10 or with a floating ground 10. In some applications, such as automotive applications, the ground 10 is a floating ground. Although an automobile electrical system is insulated from a true earth ground, the difference in potential between the automobile ground, and a true earth ground is generally small.

Optionally the wireless relay may contain a transceiver which houses receiver 9 and a transmitter 38. The transmitter 38 is capable of sending, information about the status of the wireless relay back to a relay controller such as whether or not the relay is open or closed. The wireless relay is also able to send the relay controller information about the presence of voltage on inputs 3 and 4 as well as the magnitude and polarity of the voltage. The microcontroller 7 has analog to digital converters capable of converting the voltage on control terminal 3 and the voltage on control terminal 4 to digital values. Comparison of these values yields both the magnitude and polarity of the signal being applied to the control terminals. The relay controller can compare information it receives from the wireless relay with information it receives from other sources to determine if the wireless relay is properly connected and functioning properly.

Optionally, the relay may receive power from an external source. In this case the optional positive input voltage input 12 is connected directly to positive voltage bus 16 and the optional negative voltage input 13 is connected to ground 10. The 12 volt battery of a vehicle, or a small external battery, dedicated to the relay operation, may be used as external power sources. Optionally, an input on the relay allows the relay ground to be linked to other relay grounds or to the ground of the device in which the relay is used. For example, if the relay is used in an automobile to control a particular function, the relay ground could be linked to the automobile chassis ground. Optionally, the wireless relay may include an overvoltage protection circuit. Such devices containing such circuits are well known and are commercially available.

In certain relay sockets the only effect of reversing the relay position in the socket is to exchange the more positive and the more negative voltage. The power scavenging circuit 2 allows the wireless relay to function even if it is reversed in such a socket. As set forth above the power scavenging circuit 2 provides a positive voltage bus 16 voltage and a ground from voltages applied to any terminal of the relay. Accordingly, the microcontroller 7, and the receiver 9 would be powered if the wireless relay were reversed in such a socket. A reversal of the voltages on the switched terminals would still allow the wireless relay to function properly since the actuation of the wireless relay would still serve to connect the switched terminals to each other. If there is a voltage difference between control terminal 3 and control terminal 4, sufficient to actuate the relay, the microcontroller 7 responds to the command it has received from the relay controller through the receiver 9, and actuates or doesn't actuate the relay coil as commanded by the relay controller. If appropriate, the microcontroller 7 controls the actuation of the relay through transistor 45. If there is no voltage difference between control 3 and control terminal 4, but it is appropriate for the relay to be actuated, the microcontroller sends a positive signal to the base of transistor 45. This causes a current to flow through relay coil 14 and the wireless relay will be actuated.

The control terminals and the switched terminals are arranged so that there is a control terminal and a switched terminal on each side of the wireless relay case. On one side of the case of the wireless relay a control terminal is on the top. On the opposite side a switched terminal is on top. When the relay is rotated 180 degrees the switched and control are still in the same relative position. Accordingly, even if the wireless relay is reversed in a relay socket, the wireless relay will continue to function properly.

Preferably the wireless relay is a normally open relay which connects two terminals when actuated. In another embodiment the wireless relay is a normally closed relay. This could be done, for example, by having a spring hold the relay component of the wireless relay closed. When the wireless relay is activated, the relay coil 14 could open the relay component against the action of the spring. When the actuating voltage is removed, the relay component closes. In another embodiment, there are three switched terminals. A single switched contact is normally in contact with a second switched terminal. This is a normally closed portion of the wireless relay. Upon actuation of the wireless relay, the relay makes contact with a third switched contact. This is a normally open portion of the wireless relay. In another embodiment, having three switched terminals and two relay coils, both portions of the relay are normally open. Passing a current through one relay coil brings the first switched contact into contact with the second switched contact. Passing current through the other relay coil brings the first switched contact into contact with the third switched contact.

Optionally, the wireless relay may use a latching relay instead of a conventional relay. A latching relay has two states, and remains in its last state when a signal is no longer applied. Optionally, the microcontroller 7 of the wireless relay may electronically control the relay so that it performs the functions of a latching relay. If such a relay receives an enter latch open command from the relay controller it has the ability to enter a latched open state. In the latched open state, the microcontroller will not pass the signal from control terminal 3 and control terminal 4 to the relay coil 14. If such a relay receives an enter latch closed command from the relay controller it has the ability to enter a latched closed state. In the latched closed state, the relay is always actuated, and the wireless relay will always apply a signal to the relay coil 14.

The electronically latched wireless relay will remain latched until it receives an exit latch state command from the relay controller. Optionally, the wireless relay may have the ability to maintain the latched state if it losses communication with the relay controller. In one embodiment the wireless relay in a latched state will not respond to any command from the relay controller until it first receives an exit latched state command from the relay controller. This is useful in the case where the relay controller has been deliberately reset or compromised and is sending incorrect or invalid commands.

In one embodiment the wireless relay has non-volatile memory in the microcontroller. This non-volatile memory may be used to retain the latch state when power is removed from the relay. When power is re-applied to such a wireless relay, after power has been removed, the wireless relay microcontroller will query the non-volatile memory to determine its last state before power was removed. The wireless relay will then return to the state it was in before power was removed.

Conventional wired relays have coils. Current flowing through the coils operates the relay. The resistance of common relay coils is approximately 50 to 1000 ohms. Sometimes the circuit in which the relay is placed looks for proper resistance to determine if the relay is operating properly. Resistor 43 simulates the relay coil resistance. The resistance of resistor 39, resistor 40, resistor 41, and resistor 42, are much larger than the resistance of resistor 43. Accordingly, the effect of resistor 39, resistor 40, resistor 41, and resistor 42 on the total resistance of the relay is negligible.

In some applications there is a need to bring a control terminal of the relay up to a positive voltage or down to ground potential. The wireless relay of the present invention is able to use pull up or pull down circuits. The pull up circuit is able to connect a relay control terminal to positive supply voltage through resistor 22. The pull down circuit is able to connect a relay control terminal to ground through resistor 30. Typically resistor 22 and resistor 30 have values of approximately 1000 ohms. The pull up circuit the pull down circuit may use a wide variety of transistors. Field effect transistors (FET's) are preferred. FIG. 5 illustrates a pull up circuit. FIG. 6 illustrates a pull down circuit.

As noted above, the wireless relay has a receiver 9 which is capable of receiving commands from a relay controller. The receiver 9 may operate at any frequency which is used for this type of radio communication. For example the receiver 9 may receive transmissions in at a frequency bands around 315 MHZ, 433 MHZ, 868 MHZ, 915 MHZ, or 2,450 MHZ which are common frequencies for short range wireless applications. Generally, the receiver 9 would be set for a specific frequency at the factory, to match the frequency at which the relay controller operates.

The receiver 9 receives digital commands in the form of packets of bytes. Eight bit bytes are preferred. The packets may be between one and fifty bytes long. The bytes are placed on the carrier wave using digital modulation. A commercially available integrated circuit, such as the Texas Instruments CC1101 RF Transceiver, used as a receiver, is suitable for receiving commands from the relay controller. Optionally, the wireless relay is capable of bi-directional communication, that is, the relay can both receive commands from and send information to the relay controller using an RF transceiver integrated circuit. A commercially available integrated circuit, such as the Texas Instruments CC1101 RF Transceiver, is suitable for use as a transceiver.

Frequently multiple Wireless Relay Devices will be used with a single Relay Controller. In order to assure that the commands from the relay controller go to the correct wireless relay, and to maintain the security of the system, the commands from the relay controller are encrypted. Each wireless relay has a decryption key that is an individual key which it uses to decrypt the encrypted signals coming from the relay controller. Signals can be properly decrypted only by the relay for which they are intended. The wireless relays of the present invention will ignore commands intended for other wireless relays.

The wireless relay and the relay controller may use two basic types of encryption methods: symmetric-key and public-key encryption. In symmetric-key method, the relay controller uses the same encryption key which the wireless relay uses to decrypt the command. In public-key encryption methods, the encryption key used by the relay controller is different from decryption key which the wireless relay uses to decrypt the commands. A wireless system could be exploited by car thieves. For example, if the wireless relay is part of a system to provide remote starting of the vehicle, a thief might be able to start the car if the encryption system is not strong. Similarly if the wireless relay is part of an antitheft system, good encryption enhances the security of the system. Accordingly, it is important to have a secure encryption system protecting communication between the relay controller and the wireless relays. A 128 bit encryption method is preferred.

A wireless relay which has a receiver 9, which does not have a transmitter 38, may receive signals, but is not capable of bidirectional communication. A wireless relay lacking a transmitter 38 may receive its key at the time of manufacture. This key can be communicated to the controller at the time of pairing using a communication means such as a USB port. Alternatively, the wireless relays and the relay controller may receive their keys when they are installed. The keys may be received from the manufacturer using means of communication such as a lap top connected to the interact, or a cell phone. The keys for the relays are then entered into the relay controller using a communication means such as a USB port. In one embodiment the encryption keys for the relays are stored on a web site maintained by the manufacturer of the relay. The proper key for the relay may be obtained over the internet.

In one embodiment the wireless relay is capable of bidirectional communication. Each such wireless relay has a unique serial number that is programmed at the time of manufacture. When the wireless relay is installed it enters an initialization mode. The wireless relay then transmits its serial number to the relay controller. The relay controller then obtains the appropriate individual key for this wireless relay from the manufacturer of the wireless relay. The relay controller then sends an initialization packet to the wireless relay with the appropriate individual key. At this point the relay controller and wireless relay device are paired.

The wireless relay itself has three major subcomponents, that is, a mechanical relay, a core board and a connector board. The core board contains the microcontroller, and a power scavenging circuit. The relay portion of the wireless relay may be placed on either the core board or the connector board. In one embodiment the relay portion of the wireless relay is a solid state relay. When the wireless relay replaces a conventional wired relay, the connector board connects to the existing relay circuit pins. The number of pins and pin connections for relays differ widely depending upon the application. Accordingly, many different pin connections are required to cover different applications. To create the different configurations required for various wireless relay uses, the connector board is different depending upon pin arrangement for the relay being replaced. However, the same core board may be used in a wide variety of wireless relays.

The core board is electrically connected to the connector board. In some embodiments the core board is placed above the connector board in the relay case, and is electrically connected via terminals. The types of terminals on the relay case depend upon the application. For example, some applications, such as turning on a small television, may require only a low current terminal. On the other hand, some automotive applications require higher current terminals.

For automotive application the wireless relay may be built in the same size case as a standard automotive relay. This allows the wireless relay to replace an existing automotive relay in an automotive electrical distribution box. Since the connector board of the wireless relay is configured to match the pin layout of existing relays, the replacement of the existing relay with a wireless relay may be accomplished by simply pulling out the existing relay and inserting the wireless relay.

The remote relay controller maintains periodic communication with the wireless relay device even if there is no change in the command from the remote relay controller. The remote relay controller transmits a periodic message to the wireless relay device, typically several times per second. If the wireless relay device does not receive the message, after a timeout period, typically 1-2 seconds, the wireless relay device will detect that communication with the remote relay controller has been lost.

If communication between the wireless relay and the relay controller is lost, the wireless relay may go into the pass through mode. In this case the wireless relay will function exactly like the relay it replaced. Alternatively, if the relay is in a latched state, and communication between the wireless relay and the relay controller is lost, the wireless relay will remain latched.

When the wireless relay receives a command from the relay controller it decrypts the command. The possible commands which the wireless relay could receive from the relay controller include:

1. An instruction to pass the normal control command to the relay.
2. Substitute a command from the relay controller for the normal control command.
3. Enable pull up or pull down circuits.
4. Disable pull up or pull down circuits.
5. Enter the relay latched state
6. Exit the relay latched state.

The wireless relay then executes the command. If the wireless relay is capable of bidirectional communication it can take several actions. For example, it could:

1. Transmit the status of the relay, for example, whether or not the relay is open or closed.
2. Transmit the magnitude and polarity of the voltage on inputs 3 and 4.

3. Transmit the state of the communications link between the Wireless Relay Device and the Relay Controller. This includes the number of valid packets received and the number of invalid packets received, if any.
4. Transmit the status of pull up or pull down circuits, for example, whether they are enabled or disabled.
5. Encrypt the message to be sent to the relay controller.
6. Transmit the message to the relay controller.

Multiple wireless relay devices may share a power source. In some configurations positive voltage input 12 and negative voltage input 13 will be available to some wireless relay devices, but not available to others. In these configurations a power sharing cable may be used to provide positive voltage input 12 and negative voltage input 13 from the wireless relay devices where this is available to those where it is not available.

The power sharing cable may provide positive voltage input 12 only, negative voltage input 13 only, or both positive voltage input 12 and negative voltage input 13. The power sharing cable may be low current, where it only supplies enough current to power the wireless relay device components such as microcontroller 7 and radio receiver 9. Alternatively, the power sharing cable may be high current, where it supplies enough current to power relay coil 14 and the load on switched terminals 5 and 6.

The wireless relay of the present invention may be used in a wide variety of applications. For example, it may be used for remote control of electrical machinery. In situations where the machinery draws more current that than the wireless relay can handle, the wireless relay may control a contactor which would be able handle the necessary current. The wireless relay may be used in automotive applications. For example, the relay may be used in a remote starting device for a vehicle. In the application, the wireless relay could do more than simply respond to a remotely sent command to start the engine. The microcontroller 7 of the wireless relay can receive commands from a relay controller which can determine whether or not engine start requests are passed on to the relay coil 14. In addition the relay can control the starting function by providing a variable response to an attempt to start the vehicle. For example, if the vehicle is stopped at a stop light and the driver attempts to start the engine, and the relay controller has ordered the microcontroller 7 to pass through the start request to the relay coil 14, that is, provide current to close the starter relay, the relay will close and the engine will start. However, if the relay controller obtains information indicating that the stop light will remain red for some time, it could command the microcontroller 7 to ignore start request. When the stop light is about to turn green, the relay controller 7 could command the microcontroller 7 to pass through start requests to the relay coil 14 or initiate an engine start.

The wireless relay of the present invention may be used as a part of an anti-theft system. The wireless relay can replace the relay which sends current to the vehicle Electronic Control Units (ECU). To activate the anti-theft system, the relay controller sends a command to the wireless relay to be normally open. Any attempt to start the vehicle fails. For convenience, this application could use a Bluetooth® packet based protocol receiver, such as the Texas Instruments C2540 Bluetooth® packet based protocol transceiver in the relay. This would allow a cell phone to be used to activate and inactivate the vehicle security system. Inactivation of the security system would allow the relay to respond to a driver start request. In addition the relay controller could command the relay to close, and thus start the engine. A vehicle security application, or vehicle security app, may be installed on the cell phone. This will allow the security system to turn off automatically when the cell phone, which activated the security system, comes within a detectable range. When the cell phone goes beyond the range at which it can be detected, the security system would reset and would not be possible to start the vehicle.

The wireless relay present invention may be used in an automotive application to wake up a vehicle from a sleep state. When the key on a vehicle is turned on, the ECU's on the vehicle are awake. When awake, the ECU's on a modern vehicle will respond to requests for data and respond to actuation commands, such as a command to actuate the vehicle door locks. When the key on the vehicle is turned off, the ECU's on the vehicle enter a sleep state to conserve power. When the vehicle ECU's are in the sleep state, they typically will not respond to requests for data or to actuation commands. There are many cases where it is desirable to have the ability to request data and command actuations when the vehicle ECU's are in the sleep state.

The wireless relay of the present invention may be used to control the wakeup signal input into the vehicle ECU's. The wireless relay will normally pass through the wakeup signal from the vehicle ignition system to the vehicle ECU's. When appropriate, the relay controller can command the wireless relay to close, which would then wakeup the vehicle ECU's. The vehicle ECU's would then respond to requests for data or to actuation commands. After the request for data and actuation commands are complete, the relay controller can command the wireless relay to open, and the vehicle ECU's will return to sleep state to conserve power.

Optionally, the wireless relay may include an internal clock and the ability to retain a schedule set by the user. This would allow the relay to perform certain functions on a user set schedule. For example, an antitheft method could use the internal clock in the relay to have the relay disable the main vehicle ECU between certain hours. This would prevent the car from being started at certain times of the day. For example, such a system could prevent the car from starting between midnight and 6:00 AM. This would deter night time theft of the vehicle.

Optionally, wireless relay contains a 3-axis accelerometer. The 3-axis accelerometer provides a measurement of proper acceleration in the x, y, and z axes. 3-axis accelerometers are well known and commercially available. Proper acceleration is the acceleration experienced by the relay excluding the acceleration of gravity. The 3-axis accelerometer is electrically connected to the microcontroller 7. The 3-axis accelerometer communicates with the microcontroller 7 over the electrical connection using a standard electronic communication protocol such as SPI (serial peripheral interface) or I2C (inter-integrated circuit). The microcontroller 7 can use the measurement of proper acceleration from the 3-axis accelerometer to determine how the relay should respond to signals sent to the control terminals. The microcontroller 7 receives the measurement of proper acceleration in the x, y, and z axes from the 3-axis accelerometer. The microcontroller 7 can use the measurement provided by the 3-axis accelerometer to determine useful information about the state of the vehicle. The microcontroller 7 can determine a fixed orientation reference for the vehicle. The microcontroller 7 can determine if the vehicle is in motion, the direction of motion (forward or backwards), and if the vehicle is moving in a straight line or turning. The microcontroller 7 can determine if the vehicle is on an incline and if the vehicle is pointed uphill or downhill. The microcontroller 7 can determine if the vehicle has a dangerous amount of yaw or roll that could result in a vehicle accident. The microcontroller 7 can determine if the vehicle has had a severe acceleration or deceleration event that was caused by a vehicle accident. The microcontroller 7 can determine if the vehicle has had a rapid change in incline, which may be the result of a tow truck connecting to the vehicle, or may be a result of the vehicle being elevated using a jack. The microcontroller 7 can use this information to determine how the relay should respond to signals sent to the control terminals. This would be useful in accidents. For example, if the wireless relay is used as fuel pump relay and if the microcontroller determines from the accelerometer data that there has been a severe acceleration/deceleration event, likely caused by an accident, the microcontroller could choose to open the relay and not pass through the signals from the control terminals. This would prevent a potentially dangerous condition where the fuel pump would continue to run after the accident. In wireless relays which are capable of bidirectional communication, the transmitter can transmit the measurement of proper acceleration in the x, y, and z axes provided by the 3-axis accelerometer.

The relay controller could be an electronic control unit that has been installed in the vehicle by the OEM (original equipment manufacturer) at the time of manufacture. The relay controller could also be an aftermarket device that is installed on the vehicle after the vehicle has been manufactured. This aftermarket device could be an OBD (on-board diagnostics) device that is connected to the vehicle OBD connector that can receive vehicle information from other electronic control units on the vehicle. The wireless relay in this embodiment is typically installed in a relay panel in the vehicle engine compartment that is level relative to the surface that the vehicle is on. This is advantageous because it allows the wireless relay in this embodiment to provide to the relay controller a fixed orientation reference for the vehicle that is level relative to the surface that the vehicle is on.

A differential amplifier may be used to detect the signals on control terminals 3 and 4. The wireless relay has three major subcomponents, that is, a mechanical relay, a core board and a connector board. The core board contains the microcontroller 7. The core board is electrically connected to the connector board. In some embodiments the core board is electrically connected to the connector board via sets of terminals and receiving terminals. Control terminal 3 and control terminal 4 are connected to a microcontroller 7. In some embodiments the signals from the control terminals 3 and 4 originate on the connector board and are connected to two receiving terminals on the connector board. There are two corresponding terminals on the core board that create an electrical connection with the microcontroller 7.

The signal from the control terminals 3 and 4 go through a resistor voltage divider comprising resistors 39, 40, 41, and 42. The output of the voltage divider is used to signal the microcontroller 7. Alternatively, the signals from the control terminals 3 and 4 may be sent to a differential amplifier. The differential amplifier provides an output that amplifies the difference between the control terminals 3 and 4. The output of the differential amplifier is used to signal the microcontroller 7. Differential amplifiers are well known and commercially available.

In one embodiment the wireless relay signals from control terminals 3 and 4 are input into a differential amplifier that is on the connector board. The output of the differential amplifier is connected to a receiving terminal on the connector board. There is a corresponding terminal on the core board that creates an electrical connection with the microcontroller 7. In this embodiment, only one terminal is required between the core board and the connector board, instead of two terminals. This provides a cost advantage and also saves space on the circuit boards, since the terminals are expensive and large relative to the other components on the circuit boards.

In one embodiment the differential amplifier is created using two transistors. Creating differential amplifiers from two transistors is well known. Creating the differential amplifier from two transistors can provide a cost advantage over a differential amplifier that is purchased as a component.

In one embodiment the differential amplifier is created using two transistors and has a non-linear output. Creating the differential amplifier from two transistors with a non-linear output can provide a cost advantage over a differential amplifier that is created from two transistors with a linear output, since the latter differential amplifier needs to be optimized across its entire operating range using other electrical components such as resistors.

For the differential amplifier created from two transistors with a non-linear output, a relationship between the input signals and the output can be determined through measurement. The non-linear relationship between signals from control terminals 3 and 4 input into the differential amplifier and the output of the differential amplifier can be measured across the entire input and output operating range. After this relationship has been determined, the relationship can be programmed into the microcontroller 7. When the microcontroller 7 receives the output of the differential amplifier signal, it can use the programmed relationship to determine what the signals from control terminals 3 and 4 input into the differential amplifier signify.

The wireless relay has three major subcomponents, that is, a mechanical relay, a core board and a connector board. The core board contains the microcontroller 7. The core board is electrically connected to the connector board. There are typically 5-6 electrical connections between the core board and the connector board. In some embodiments the core board is electrically connected to the connector board via sets of terminals and receiving terminals. In some embodiments the terminals can be part of a male connector and the receiving terminals can be part of a female connector. Such connectors are well known and commercially available.

In one embodiment the terminals on the core board of the wireless relay can be electrically connected to the connector board or can be used to reprogram the microcontroller 7 on the core board. In this embodiment, the core board may be easily separated from the connector board, breaking the electrical connection between the core board and the connector board. In the embodiment where the terminals are part of a male connector and the receiving terminals are part of a female connector, the core board can be easily separated from the connector board by disconnecting the connector.

After the core board and connector board are separated, the terminals on the core board can then be connected to a device that can reprogram the microcontroller 7. Such reprogramming devices are well known and commercially available. There are typically 4-5 electrical connections required between the reprogramming device and the microcontroller 7. For example, positive voltage, ground, reset, clock, and programming data electrical connections may be required. When the electrical connections are made, the microcontroller 7 can be reprogrammed by the reprogramming device. The core board can then be re-connected to the connector board.

The ability to reprogram the microcontroller 7 provides a performance advantage, because the microcontroller 7 will frequently need to be reprogrammed after it is initially manufactured. Using the existing terminals on the core board to reprogram the microcontroller 7 provides a cost advantage and also saves space on the core board. If the existing terminals on the core board are not used, a separate set of terminals is required to create the 4-5 electrical connections required between the reprogramming device and the microcontroller 7. Using a separate set of terminals increases the cost and the size of the core board of the wireless relay.

Optionally, the wireless relay may include an overvoltage protection circuit. The overvoltage protection circuit can consist of diodes, zener diodes, and transistors. The overvoltage protection circuit may be designed such that when a positive voltage less than a threshold voltage is present, for example 24V, the transistor in the overvoltage protection circuit is conductive, and the positive voltage is passed through to the wireless relay. When a positive voltage greater than a threshold voltage is present, for example 25V, the transistor in the overvoltage protection circuit is not conductive, and the positive voltage is not passed through to the wireless relay. Such overvoltage protection circuits are well known, and the circuit components are commercially available.

Optionally, the wireless relay may include a reverse-voltage protection circuit. The reverse-voltage protection circuit can consist of diodes, zener diodes, and transistors. The reverse-voltage protection circuit be designed such that when a reverse voltage is present, the transistor in the reverse-voltage protection circuit is not conductive, and the reverse voltage is not passed through to the wireless relay. Such reverse-voltage protection circuits are well known, and the circuit components are commercially available.

The wireless relay may use a wide variety of relays such as 6 volt or 12 volt relays. It is possible to use relays of other voltages. Higher voltage relays such as 24 volt relays may be used in electrical systems of heavy duty trucks, construction equipment, agriculture equipment, and military vehicles which frequently have 24 volt electrical systems. The most common commercially available relay is a 12 volt relay, which requires an input voltage near 12 volts. For a 12 volt relay, an appropriate input voltage range must be supplied to the relay to allow it to function, typically 9.5V-14.5V. In the wireless relay, the positive voltage bus 16 is the input voltage for the relay.

In one embodiment the wireless relay uses a 6V relay in an automotive application. In this case, an appropriate input voltage range must be supplied to the relay to allow it to function, typically 3.5V-8.5V. In this embodiment, the low voltage bus 11 is the input voltage for the relay. The linear voltage regulator 44 supplies the low voltage bus 11 by reducing the voltage on the positive voltage bus 16 to a constant 3.5V, which is at the low end of the appropriate input voltage range for the 6V relay.

Using the 6V relay with this lower input voltage range is advantageous in an automotive application, because it provides an appropriate input voltage for the relay when the vehicle is starting. When the vehicle starts, a significant amount of current is drawn from the vehicle 12V battery, and the 12V battery voltage drops low for a short period of time, typically as low as 5V. With a 12V relay, when the vehicle starts, there will frequently not be a sufficient input voltage on positive voltage bus 16, which is supplied by the vehicle 12V battery, to allow the relay to function. With a 6V relay, when the vehicle starts, there is still a sufficient input voltage on the low voltage bus 11 to allow the relay to function. The linear voltage regulator 44 is able to supply the low voltage bus 11 at a constant 3.5V even if the positive voltage bus 16, which is supplied by the vehicle 12V battery, is 5V.

It will be understood that various changes in details, materials and arrangements of parts, which have been herein described and illustrated in order to explain the nature of the invention, may be made by those skilled in the art within the principle and scope of the invention as expressed in the appended claims. However, while the invention has been described with reference to the structure disclosed herein, it is not to be confined to the details set forth, and this application is intended to cover such modifications or changes as may come within the scope of the following claims.

What is claimed:

1. A replacement wireless relay comprising:
   a. a relay, controlled by a microcontroller operably connected to a radio receiver, that receives instructions from a relay controller;
   b. said relay has a simulated resistor representative of a reference resistance;
   c. said instructions pass through commands that are sent to control terminals for the relay to switched terminals for the relay to allow the wireless relay to function the same as the relay it is replacing in the existing application; and
   d. said instructions from the relay controller are capable of opening or closing the switched terminals for the relay to override a command on the control terminals for the relay from the existing application.

2. A replacement wireless relay according to claim 1 wherein said replacement relay is a latching relay.

3. A replacement wireless relay according to claim 1 further comprising a power scavenging circuit.

4. A replacement wireless relay according to claim 1 further comprising a reverse-voltage protection circuit.

5. A replacement wireless relay according to claim 1 further comprising a radio transmitter capable of bi-directional communication.

6. A replacement wireless relay according to claim 1 in which the receiver and transmitter comprise a packet based protocol transceiver.

7. A replacement wireless relay according to claim 1 further comprising a pull up resistor circuit that allows the wireless relay to connect a control terminal to positive supply voltage through the pull up resistor.

8. A replacement wireless relay for a vehicle comprising:
   a. a relay, controlled by a microcontroller operably connected to a radio receiver, that receives instructions from a relay controller;
   b. said relay has a simulated resistor representative of coil resistance in a vehicle; and
   c. said instructions pass through commands that are sent to control terminals for the relay to switched terminals for the relay to allow the wireless relay to function the same as the relay it is replacing in the existing application.

9. A replacement wireless relay for a vehicle according to claim 8 further comprising a power scavenging circuit.

10. A replacement wireless relay for a vehicle according to claim 8 further comprising a pull down resistor circuit that allows the wireless relay to connect a control terminal to ground through the pull down resistor.

11. A replacement wireless relay for a vehicle according to claim 8 wherein said instructions from the relay controller are capable of opening or closing the relay switched terminals to override a command on the relay control terminals from the existing application.

12. A replacement wireless relay for a vehicle according to claim 8 further comprising a 3-axis accelerometer.

13. A replacement wireless relay for a vehicle according to claim 8 further comprising a differential amplifier that inputs the control terminal signals and outputs the difference between the control terminal signals.

14. A replacement wireless relay for a vehicle according to claim 8 wherein the relay is a solid-state relay.

15. A wireless relay comprising:
   a. a relay, controlled by a microcontroller operably connected to a radio receiver, that receives instructions from a relay controller;
   b. said relay has a simulated resistor representative of coil resistance in a vehicle;
   c. said instructions pass through commands that are sent to control terminals for the relay to switched terminals for the relay; and
   d. a power scavenging circuit operably connected to said relay.

16. A wireless relay according to claim 15 wherein the relay is normally closed.

17. A wireless relay according to claim 15 further comprising a power sharing cable.

18. A wireless relay according to claim 15 further comprising a core board and a connector board.

19. A wireless relay according to claim 15 further comprising a core board with terminals that can be used to reprogram the microcontroller.

20. A wireless relay according to claim 15 further comprising a 3-axis accelerometer.

* * * * *